United States Patent
Tabak (10) Patent No.: US 12,340,596 B2
(45) Date of Patent: Jun. 24, 2025

(54) CONTINUOUS CONTEXT-BASED LEARNING FOR LANE PREDICTION

(71) Applicant: AUTOBRAINS TECHNOLOGIES LTD, Tel Aviv-Jaffa (IL)

(72) Inventor: Tom Tabak, Tel Aviv (IL)

(73) Assignee: AUTOBRAINS TECHNOLOGIES LTD, Tel Aviv (IL)

(*) Notice: Subject to any disclaimer, the term of this patent is extended or adjusted under 35 U.S.C. 154(b) by 373 days.

(21) Appl. No.: 18/045,824

(22) Filed: Oct. 11, 2022

(65) Prior Publication Data
US 2023/0114215 A1 Apr. 13, 2023

Related U.S. Application Data

(60) Provisional application No. 63/262,389, filed on Oct. 11, 2021.

(51) Int. Cl.
  *G06V 20/56* (2022.01)
  *G06V 10/762* (2022.01)
  *G06V 10/774* (2022.01)

(52) U.S. Cl.
  CPC .......... *G06V 20/588* (2022.01); *G06V 10/762* (2022.01); *G06V 10/774* (2022.01); *G06V 2201/10* (2022.01)

(58) Field of Classification Search
  CPC .. G06V 20/588; G06V 10/762; G06V 10/774; G06V 2201/10
  See application file for complete search history.

(56) References Cited

U.S. PATENT DOCUMENTS

| | | | |
|---|---|---|---|
| 10,275,667 B1* | 4/2019 | Kim | G06F 18/217 |
| 2014/0037209 A1* | 2/2014 | Robinson | G06V 10/762 |
| | | | 382/170 |
| 2022/0138481 A1* | 5/2022 | Deshpande | G06V 10/764 |
| 2023/0024468 A1* | 1/2023 | Robert | G06V 10/774 |
| 2023/0096065 A1* | 3/2023 | Zhang | G01C 21/20 |
| | | | 701/450 |

* cited by examiner

*Primary Examiner* — Amandeep Saini
*Assistant Examiner* — Emma Rose Goebel
(74) *Attorney, Agent, or Firm* — RECHES PATENTS (57) ABSTRACT

A method for lane boundary detection, the method may include obtaining an image of an environment of a vehicle, the environment comprises at least one lane boundary portions; wherein the image comprises a first plurality of two dimensional (2D) image segments; converting, by a first machine learning process, each of the 2D segments to a segment vector to provide a first plurality of segment vectors; wherein each segment vector represents a 2D segment; finding an associated cluster for each segment vector to provide a second plurality of associated clusters; searching for at least one LBR cluster of the second plurality of associated clusters; and determining, for each LBR segment vector and by a second machine learning process, a location of a lane boundary portion within a 2D image segment that is represented by the LBR segment vector; wherein a LBR segment vector has an associated cluster that is a LBR cluster.

17 Claims, 5 Drawing Sheets

CONTINUOUS CONTEXT-BASED LEARNING FOR LANE PREDICTION

BACKGROUND

The accuracy of a machine learning process depends, at least in part, on the dataset used for training the machine learning process. For example—the likelihood of learning generalizable information dramatically increases as the number of relevant dataset items increases.

Lane detection includes detecting lane boundaries. Lane boundary detection is complicated because there is a very broad range of lane boundaries that differ from each other by shape and appearance.

Tagging images to indicate the presence of lane boundaries is relatively costly.

The broad range of lane boundaries and the lack of a significant amount of reliably tagged images prevents an application of a reliable lane detection method.

There is a growing need to provide a method for lane detection.

SUMMARY

There is provided a method, a system and/or a non-transitory computer readable medium for providing a road boundary model.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided a method, a system and/or a non-transitory computer readable medium for using a road boundary model.

Figure 1:
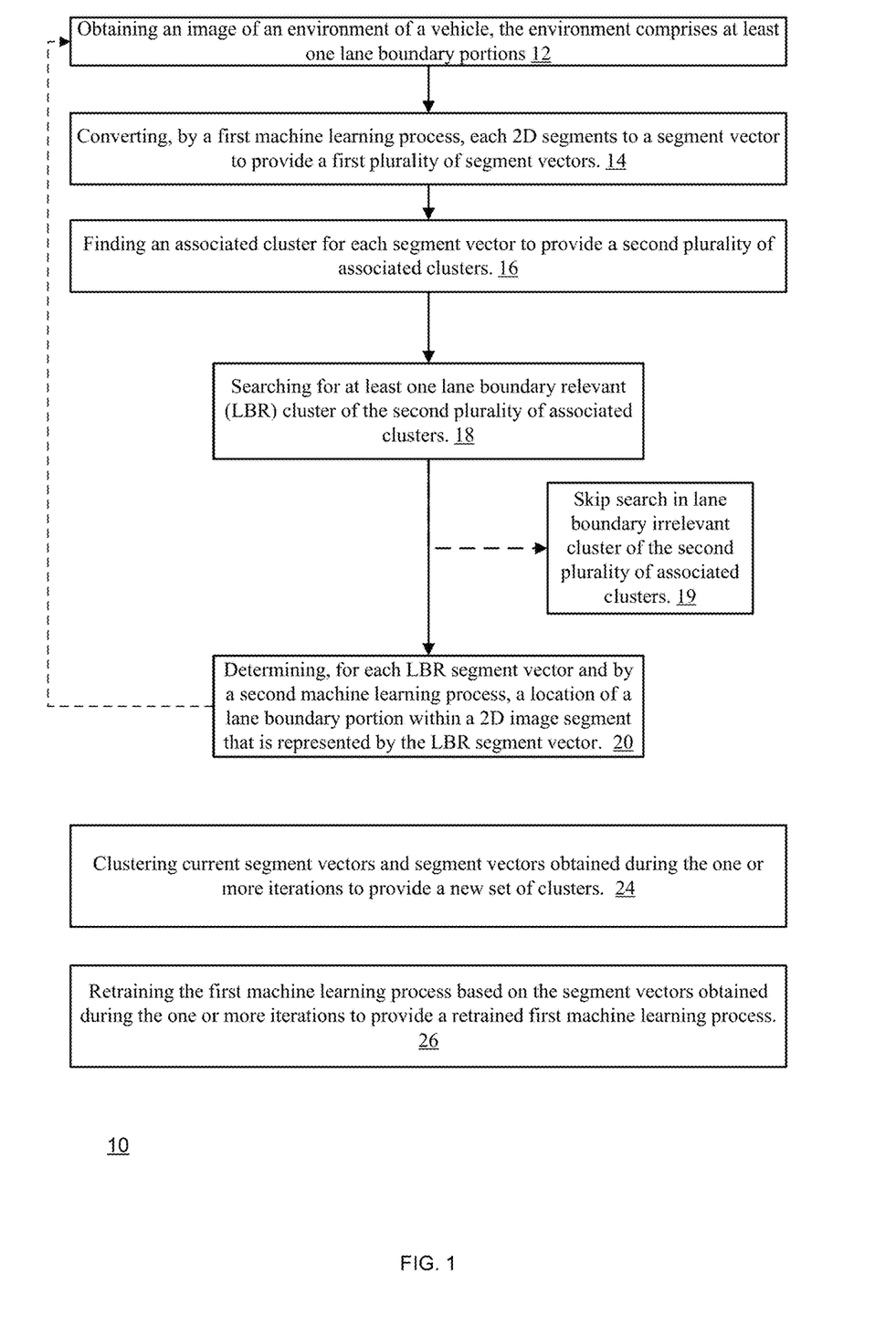
FIG. 1 illustrates an example of a method.

FIG. 1 illustrates an example of a method 10 for lane boundary detection.

Method 10 may start by step 12 of obtaining an image of an environment of a vehicle, the environment comprises at least one lane boundary portions. The image may include a first plurality of two dimensional (2D) image segments.

Step 12 may be followed by step 14 of converting, by a first machine learning process, each of the 2D segments to a segment vector to provide a first plurality of segment vectors. Each segment vector represents a 2D segment. A segment vector may include, for example, the pixels of the 2D segment—arranged in a sequence on instead of a 2D array of pixels.

Step 14 may be followed by step 16 of finding an associated cluster for each segment vector to provide a second plurality of associated clusters.

Thus—the segment vectors are classified—and each segment vector "finds" the most relevant cluster.

Step 16 may be followed by step 18 of searching for at least one lane boundary relevant (LBR) cluster of the second plurality of associated clusters.

A segments vector that is associated with a LBR cluster is expected to include a lane boundary portion. When such a segment vector is found there is a need to locate the lane boundary portion within the 2D segment represented by the segment vector. This search can be done in relation to LBR clusters—but in order to save energy or otherwise to save time and/or unnecessary usage of resources—it should not be done when a cluster is irrelevant (lane boundary irrelevant (LBIR) cluster).

Step 18 may be followed by step 20 of determining, for each LBR segment vector and by a second machine learning process, a location of a lane boundary portion within a 2D image segment that is represented by the LBR segment vector.

For clusters that are lane boundary irrelevant—step 18 may be followed step 19 of not searching these clusters for the exact locations Multiple iterations of steps 12, 14, 16 and 20 can be done.

During the multiple iterations new segment vectors are obtained.

The addition of the new segment vectors may be used for reclassifying or re-clustering the segment vectors—including the new segment vectors and the older segment vectors.

The reclassifying or re-clustering may be executed after any number of iterations (1, 2, 3, and more).

For example—assuming that one or more iterations (of the multiple iterations) were executed using clusters generated based on current segment vectors—then method 10 may include step 24 of clustering the current segment vectors and segment vectors obtained during the one or more iterations to provide a new set of clusters.

The addition of the new segment vectors may be used for retraining the first machine learning process.

The retraining the first machine learning process may be executed after any number of iterations (1, 2, 3, and more).

For example—assuming that one or more iterations (of the multiple iterations) were executed—then method 10 may include step 26 of retraining the first machine learning process based on the segment vectors obtained during the one or more iterations to provide a retrained first machine learning process.

Figure 2:
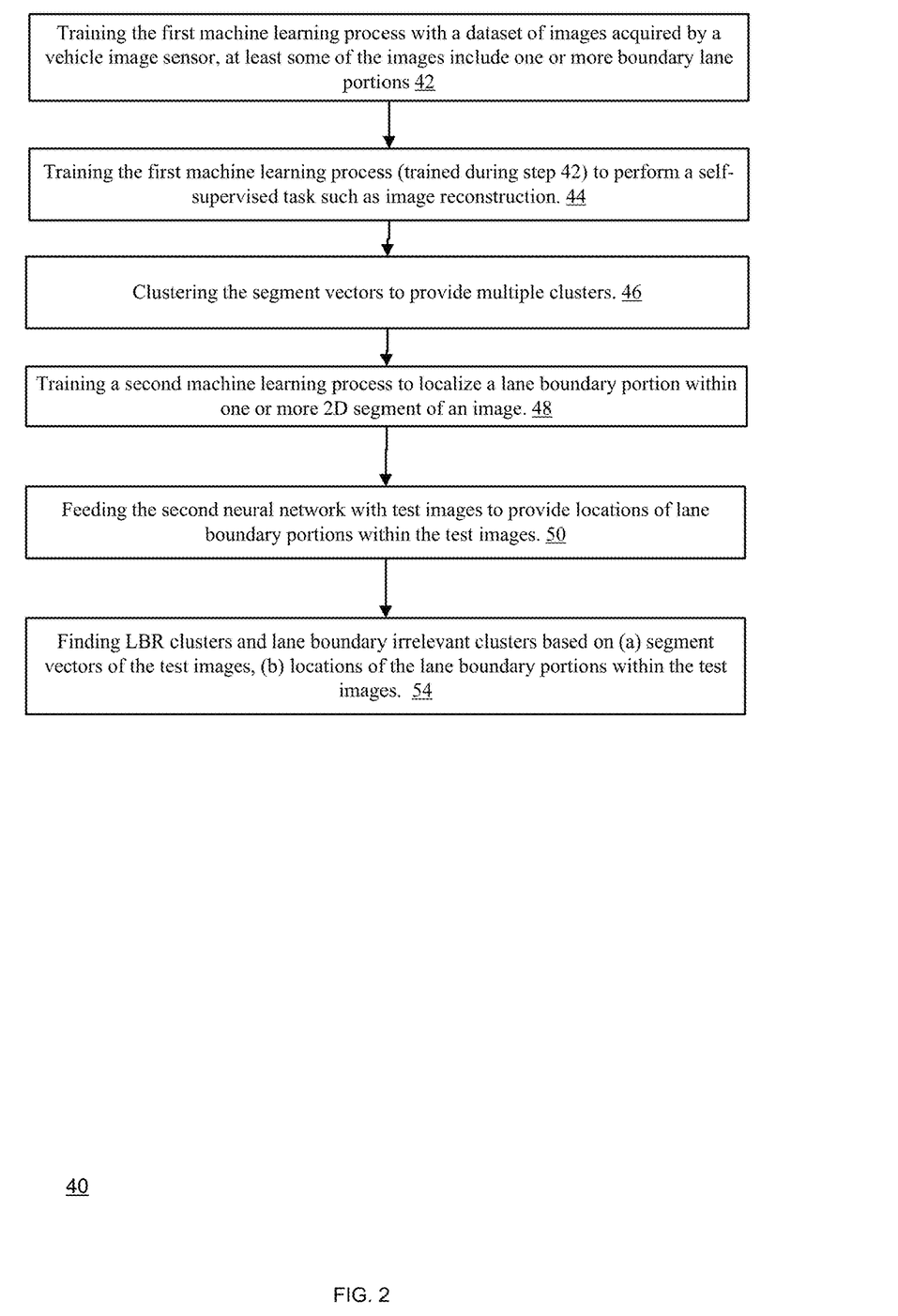
FIG. 2 illustrates an example of a method.
Figure 3:
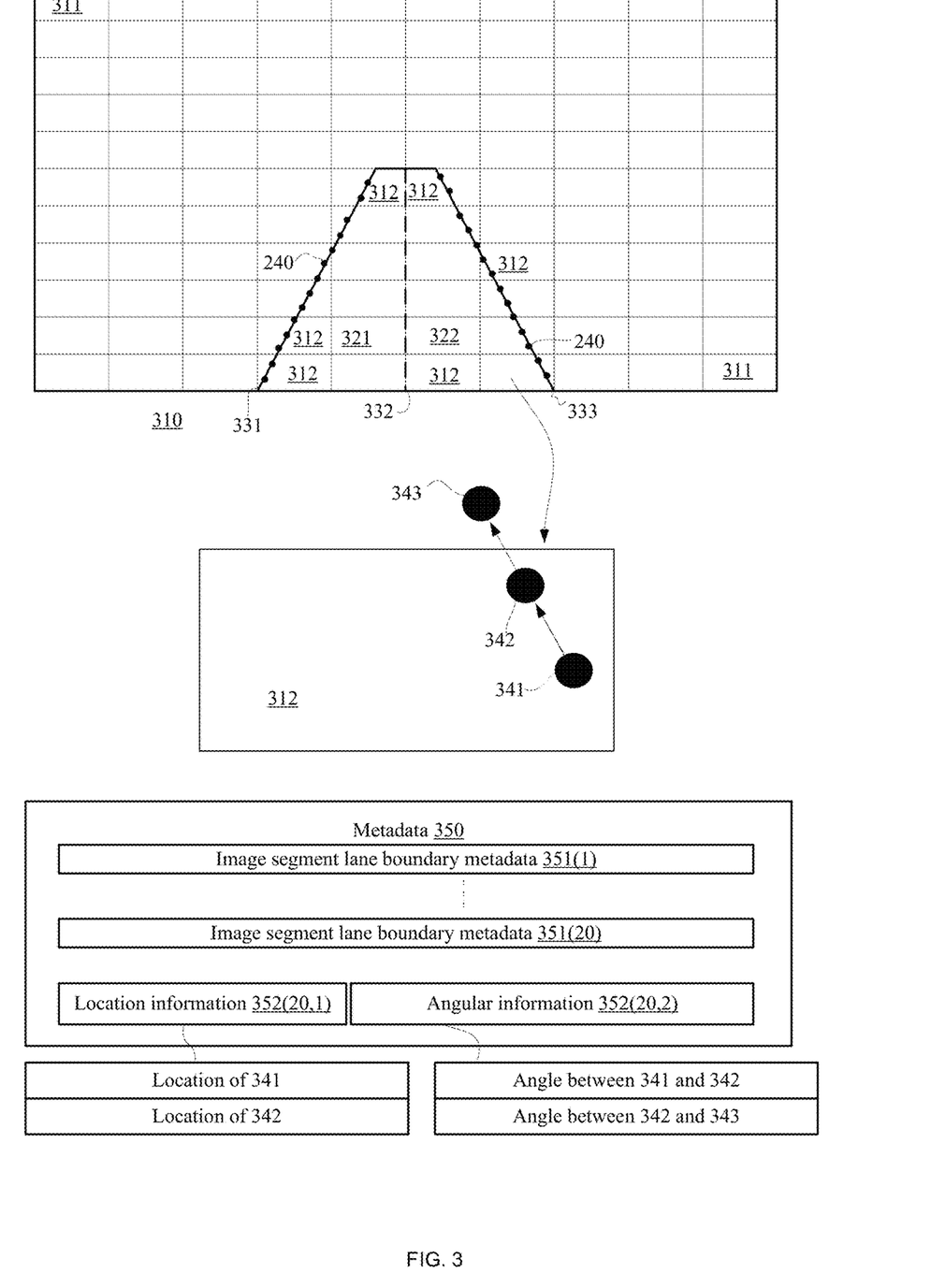
FIG. 3 illustrates an example of an image and various data structures.

FIG. 2 illustrates an example of a method 40 for training one or more machine learning processes.

Method 40 may start by step 42 of training the first machine learning process with a dataset of images acquired by a vehicle image sensor, at least some of the images include one or more boundary lane portions. The dataset may or may not include boundary lane metadata. For example—step 42 may be executed in an unsupervised manner when boundary lane metadata does not exist. Yet for another example—step 42 may be executed in a supervised manner when boundary lane metadata exists.

Step 42 may be followed by step 44 of training the first machine learning process (trained during step 42) to perform a self-supervised task such as image reconstruction, whereas other self-supervision tasks may be applied mutatis mutandis.

Step 44 may include training the first neural network to convert 2D segments to segment vectors.

Step 44 may be followed by step 46 of clustering the segment vectors to provide multiple clusters. Any clustering method may be applied—for example—K nearest neighbors (KNN), K-means, gaussian mixture model (GMM), and the like.

Method 40 may also include step 48 of training a second machine learning process to localize a lane boundary portion within one or more 2D segment of an image. The lane boundary portion may include one or more boundary mini-objects, a mini-object may be a pixel, multiple pixels, and the like.

The second machine learning process may, following the training, be able to receive an image and output locations (for example—location of pixels that belong to a lane boundary, spatial relationship—for example direction—between pixels, and the like).

An example of training of step 48 is illustrated in U.S. provisional patent Ser. No. 63/202,976 filing date Jul. 1, 2021 which is incorporated herein by reference.

The training is supervised and uses lane boundary metadata.

Step 48 may be followed by step 50 of feeding the second neural network with test images to provide locations of lane boundary portions within the test images.

Step 50 may be followed by 52 of finding LBR clusters and lane boundary irrelevant clusters based on (a) segment vectors of the test images, (b) locations of the lane boundary portions within the test images.

The test images may include one or more images that were fed to the first machine learning process during step 44 and/or may include new test images—one or more test images that were not fed to the first machine learning process during step 44. Any new test image may be fed to the first machine learning process (for example during step 50).

Step 52 may include finding each relevant 2D segment (a relevant 2D segment of a test image includes a lane boundary portion), finding a relevant segment vector that represents the relevant 2D segment, finding the cluster of the relevant segment vector. The relevancy of a cluster (whether the cluster is an LBR cluster) is determined based on the relevancy of the segment vectors of the cluster.

Figure 4:
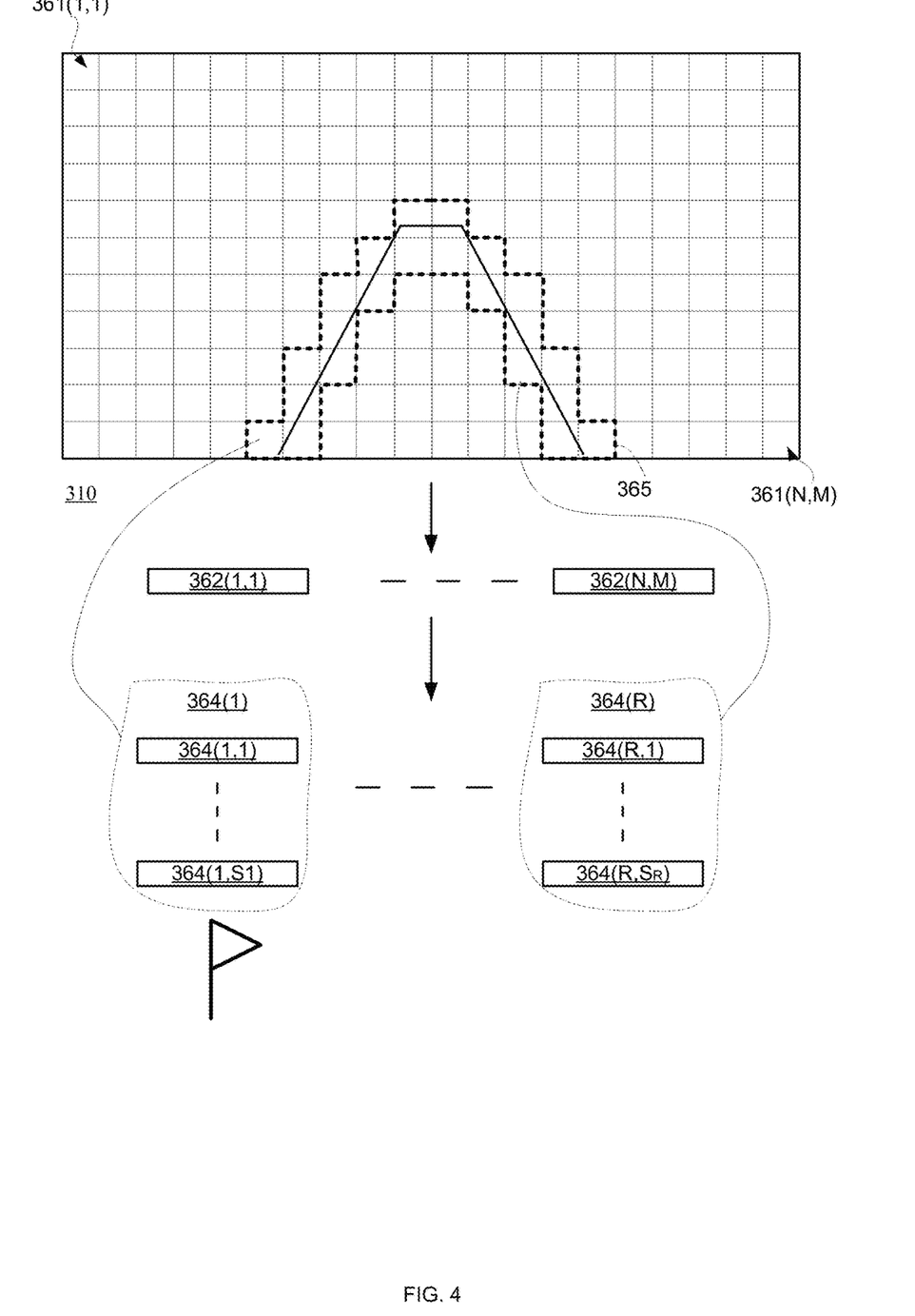
FIG. 4 illustrates an example of an image and various data structures.

FIG. 4 illustrates image 310 of a road having two lanes 321 and 322, and three land boundaries—leftmost lane boundary 331 (also a left road boundary), middle lane boundary 322 and rightmost lane boundary 333 (also a road boundary).

In FIG. 4 there are twenty relevant image segments 312—each includes at least some lane boundary points candidates. The LBPCs are collectively denoted 240.

FIG. 4 also illustrates an expanded view of a relevant image segment 312 that includes first LBPC 341 and second LBPC 342. The second LBPC 342 is followed by third LBPC 341 of another relevant image segment. Location information of each one of the first, second and third LBPC may be provided, as well as angular information regarding the angle of a virtual line between a first LBPC and a second LBPC, and the angle of a virtual line between a second LBPC and a third LBPC.

FIG. 4 also illustrates metadata 350 that includes (assuming twenty relevant image segments) twenty instances of image segment lane boundary metadata 351(1)-351(200)—one per relevant image segment. Each instance of image segment lane boundary metadata includes location information and angular information—for example location information 350(20,1) and angular information 350(20,2) of image segment lane boundary metadata 351(20). Metadata 350 may also include confidence level information 354—which may relate to the image segment lane boundary candidates and/or to the estimated lane boundaries.

Figure 5:
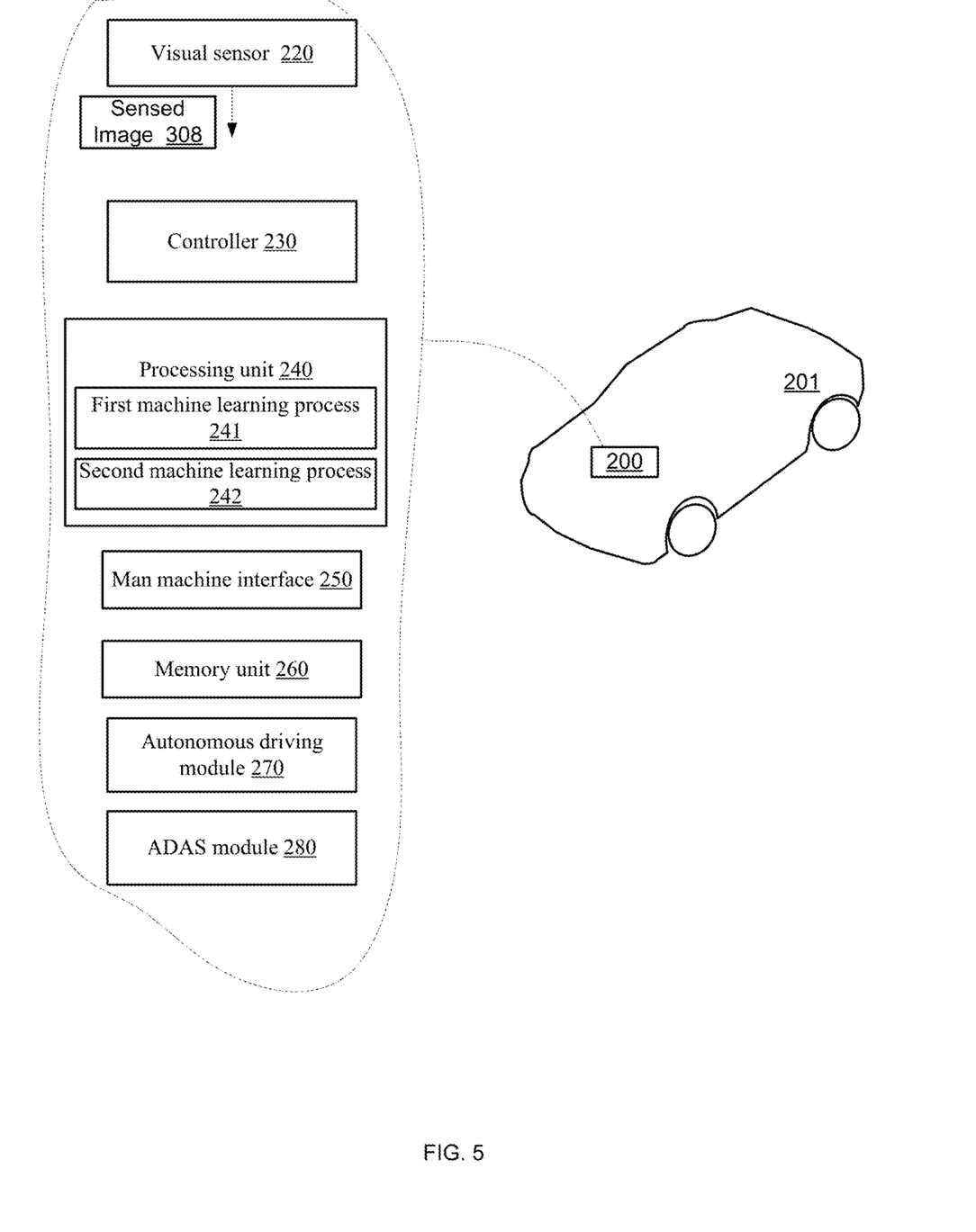
FIG. 5 illustrates an example of a vehicle.

FIG. 5 illustrates an image 310 with N×M 2D segments 361(1,1)-361(N,M), N×M segment vectors 362(1,1)-362(N,M) that represent the 2D segments, R clusters (364(1)-364(R)) of segment vectors. Cluster 364(1) includes segment vectors (now marked according to their cluster—and not according to their location in the image) 364(1,1)-364(1,S1). Cluster 364(R) includes segment vectors 364(R,1)-364(R, $S_R$).

Referring to image 310—there are relevant 2D segments (surrounded by dashed line 365) that include lane boundary portions and the other 2D segments are irrelevant.

The determination of which cluster is a LBR cluster and which cluster is LBRI—is based on the distribution of the relevant segment vectors between the clusters.

FIG. 6 illustrates metadata a vehicle 201 that include system 200.

System 200 may include visual sensor 220 such as a camera (illustrated as outputting sensed image 308), controller 230, processing unit 240 (that may include (or may be configured to implement) a first machine learning process 241 and a second machine learning process 242), man machine interface such as display 250, memory unit 260, autonomous driving module 270 and ADAS module 280.

The autonomous driving module 270, and ADAS module 280 may respond to lane boundary information generated by the processing unit 240.

The controller 230 may control the operation of the system 200.

System 200 may be configured to execute method 10.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for lane boundary detection, the method comprises:
    obtaining an image of an environment of a vehicle, the environment comprises at least one lane boundary portions; wherein the image comprises a first plurality of two dimensional image segments;
    converting, by a first machine learning process, each two dimensional image segment of the first plurality of two dimensional image segments to a segment vector that represents the two dimensional image segment and comprises a sequence of pixels of the two dimensional image segment, to provide a first plurality of segment vectors;
    finding an associated cluster for each of the first plurality of segment vectors to provide a second plurality of associated clusters;
    searching for lane boundary relevant clusters of the second plurality of associated clusters, wherein the lane boundary relevant clusters comprise lane boundary relevant segment vectors that represent two dimensional image segments that are expected to include lane boundary pixels of lane boundary portions wherein the searching involves
    locating the lane boundary portions within the two dimensional image segments, by:
        determining, for each lane boundary relevant segment vector and by a second machine learning process, a location of the lane boundary portion within a two dimensional-image segment that is represented by the lane boundary relevant segment vector;
        identifying a lane boundary irrelevant cluster of the second plurality of associated vectors; wherein the identified lane boundary irrelevant cluster comprises lane boundary irrelevant segment vectors that represent two dimensional segments that are not expected to include lane boundary pixels; and
        skipping a search for a location of a lane boundary portion within any two dimensional image segment that is represented by a lane boundary irrelevant segment vector.

2. The method according to claim 1 further comprising reclassifying or re-clustering segment vectors, based on the lane boundary relevant segment vectors and using the first machine learning process, associated with at least one of the first segment vectors and segment vectors that existed before the obtaining of the image.

3. The method according to claim 1, comprising retraining the first machine learning process based on the first plurality of segment vectors.

4. The method according to claim 1 wherein the first machine learning process was trained by a training process that comprised training the first machine learning process to provide a transformer machine learning process; and training the transformer machine learning process using a self-supervised task.

5. The method according to claim 4 comprising converting, by the first machine learning process, image segments of multiple test images to multiple segment vectors; and clustering the multiple segment vectors.

6. The method according to claim 1 wherein the second machine learning process was trained by a supervised training process that comprised feeding the second machine learning process with images of environment of a vehicle and with lane boundary location metadata.

7. The method according to claim 6 wherein the lane boundary location metadata comprises angular information regarding an angle of a virtual line between a pair of adjacent lane border pixel candidates.

8. The method according to claim 1, wherein the finding of the associated cluster is executed on a current set of clusters that comprise current segment vectors; wherein the method comprises performing a clustering operation on the current segment vectors and on the first plurality of segment vectors.

9. The method according to claim 1, further comprising feeding, based on the locating, the lane boundary relevant segment vectors of the lane boundary relevant clusters to the first machine learning process, to continuously find, at the first machine learning process, additional associated clusters for an additional plurality of two dimensional image segments.

10. A non-transitory computer readable medium for lane boundary detection, the non-transitory computer readable medium stores instructions executable by a processing circuit for:
    converting, by a first machine learning process, each two dimensional image segment of the first plurality of two dimensional image segments to a segment vector that represents the two dimensional image segment and comprises a sequence of pixels of the two dimensional image segment, to provide a first plurality of segment vectors;
    finding an associated cluster for each of the first plurality of segment vectors to provide a second plurality of associated clusters;
    searching for lane boundary relevant clusters of the second plurality of associated clusters, wherein the lane boundary relevant clusters comprise lane boundary relevant segment vectors that represent two dimensional image segments that are expected to include lane boundary pixels of lane boundary portions wherein the searching involves locating the lane boundary portions within the two dimensional image segments, by:
        determining, for each lane boundary relevant segment vector and by a second machine learning process, a location of the lane boundary portion within a two dimensional image segment that is represented by the lane boundary relevant segment vector;
        identifying a lane boundary irrelevant cluster of the second plurality of associated vectors; wherein the identified lane boundary irrelevant cluster comprises lane boundary irrelevant segment vectors that represent two dimensional segments that are not expected to include lane boundary pixels; and skipping a search for a location of a lane boundary portion within any two dimensional image segment that is represented by a lane boundary irrelevant segment vector.

11. The non-transitory computer readable medium according to claim 10, wherein the finding of the associated cluster is executed on a current set of clusters that comprise current segment vectors; wherein the non-transitory computer readable medium comprises performing a clustering operation on the current segment vectors and on the first plurality of segment vectors.

12. The non-transitory computer readable medium according to claim 11 that stores instructions for updating the first machine learning process based on the first plurality of segment vectors.

13. The non-transitory computer readable medium according to claim 11 wherein the first machine learning process was trained by a training process that comprised training the first machine learning process to provide a transformer machine learning process; and training the transformer machine learning process using a self-supervised task.

14. The non-transitory computer readable medium according to claim 13, that stores instructions for converting, by the first machine learning process, image segments of multiple test images to multiple segment vectors; and clustering the multiple segment vectors.

15. The non-transitory computer readable medium according to claim 11 wherein the second machine learning process was trained by a supervised training process that comprised feeding the second machine learning process with images of environment of a vehicle and with lane boundary location metadata.

16. The method according to claim 15, wherein the angular information is a quantized value selected out of a first number of different quantized values, wherein the first number does not exceed seven.

17. The method according to claim 15, wherein the angular information is a quantized value selected out of a first number of different quantized values, wherein different parts of the second neural networks are allocated for different quantized angular ranges.

* * * * *